United States Patent
Hall et al.

(10) Patent No.: US 9,600,901 B2
(45) Date of Patent: Mar. 21, 2017

(54) VIDEO TRACKER HAVING DIGITAL SIGNAL PROCESSOR

(71) Applicant: International Business Machines Corporation, Armonk, NY (US)

(72) Inventors: Ezra D. B. Hall, Richmond, VT (US); Aydin Suren, Essex Junction, VT (US); Clark N. Vandam, Hillsboro, OR (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 14/579,562

(22) Filed: Dec. 22, 2014

(65) Prior Publication Data

US 2016/0180543 A1 Jun. 23, 2016

(51) Int. Cl.
*G06T 7/20* (2006.01)

(52) U.S. Cl.
CPC .... *G06T 7/204* (2013.01); *G06T 2207/10016* (2013.01); *G06T 2207/30232* (2013.01); *G06T 2207/30241* (2013.01)

(58) Field of Classification Search
CPC . G06T 7/20; G06T 7/204; G06T 2207/30241; G06K 9/00771; G06K 9/6202; G08B 13/19608
See application file for complete search history.

(56) References Cited

U.S. PATENT DOCUMENTS

| | | | |
|---|---|---|---|
| 5,303,172 A | 4/1994 | Magar et al. | 364/726 |
| 8,577,949 B2 | 11/2013 | Delaquil et al. | 708/520 |
| 8,687,689 B2 | 4/2014 | Baraniuk et al. | 375/240.01 |
| 2010/0054536 A1* | 3/2010 | Huang et al. | 382/103 |

OTHER PUBLICATIONS

Candes et al., "L1-MAGIC: Recovery of Sparse Signals via Convex Programming", Caltech 2005.
Donoho et al., "Compressed Sensing", Stanford University, Sep. 14, 2004.
Mei et al., "Robust Visual Tracking and Vehicle Classification via Sparse Representation", IEEE Transactions on Pattern Analysis and Machine Intelligence, vol. 33, No. 11, Nov. 2011.
Shewchuk, "An Introduction to the Conjugate Gradient Method Without the Agonizing Pain", Carnegie Mellon University, Aug. 4, 1994.
Vandam et al., "A Hybrid CamShift and L1-minimization Video Tracking Algorithm", IEEE 2012.
Wright et al., "Robust Face Recognition via Sparse Representation", IEEE Transactions on Pattern Analysis and Machine Intelligence, vol. 31, No. 2, Feb. 2009.

* cited by examiner

*Primary Examiner* — Andrew W Johns
(74) *Attorney, Agent, or Firm* — Steven J. Meyers; Hoffman Warnick LLC

(57) ABSTRACT

Various embodiments include solutions for analyzing three-dimensional video data. Various embodiments include a system having: at least one sensor for detecting at least one of object occlusion or drift in visual data; and a digital signal processor coupled with the at least one sensor, the digital signal processor having at least one database (DB) including target template sets for analyzing both object occlusion in visual data and drift in visual data, wherein the digital signal processor is configured to switch between one of the target template sets and a distinct target template set in the at least one DB based upon detection of the at least one of object occlusion or drift in the visual data.

11 Claims, 7 Drawing Sheets

$$d = (i \times j) = [a_1 \; a_2 \; \cdots \; a_n \; | \; e^-_1 \; e^-_2 \; \cdots \; e^-_{i \times j} \; | \; e^+_1 \; e^+_2 \; \cdots \; e^+_{i \times j}]$$

regular templates + trivial (neg) templates + trivial (pos) templates

FIG. 2

$$\begin{bmatrix} y_1 \\ y_2 \\ \circ \circ \circ \\ y_d \end{bmatrix} = \begin{bmatrix} t_{1_1} & t_{2_1} & \circ\circ\circ & t_{n_1} & e^+_{1_1} & e^+_{2_1} & \circ\circ\circ & e^+_{d_1} & e^-_{1_1} & e^-_{2_1} & \circ\circ\circ & e^-_{d_1} \\ t_{1_2} & t_{2_2} & & t_{n_2} & e^+_{1_2} & e^+_{2_2} & & e^+_{d_2} & e^-_{1_2} & e^-_{2_2} & & e^-_{d_2} \\ \circ & \circ & \circ\circ\circ & \circ & \circ & \circ & \circ\circ\circ & \circ & \circ & \circ & \circ\circ\circ & \circ \\ \circ & \circ & & \circ & \circ & \circ & & \circ & \circ & \circ & & \circ \\ \circ & \circ & & \circ & \circ & \circ & & \circ & \circ & \circ & & \circ \\ t_{1_d} & t_{2_d} & \circ\circ\circ & t_{n_d} & e^+_{1_d} & e^+_{2_d} & \circ\circ\circ & e^+_{d_d} & e^-_{1_d} & e^-_{2_d} & \circ\circ\circ & e^-_{d_d} \end{bmatrix} \begin{bmatrix} c_1 \\ c_2 \\ \circ \\ \circ \\ \circ \\ c_{n+2d} \end{bmatrix}$$

$(d \times 1)$ — $y$ $(d \times (n+2d))$ — $B$ $((n+2d) \times 1)$ — $C$ $d = (i \times j)$ — $y$

VIDEO TRACKER HAVING DIGITAL SIGNAL PROCESSOR

BACKGROUND

Aspects of the invention relate generally to the field of data processing. More particularly, various aspects of the invention relate to processing video data, along with hardware for performing that processing.

As the use of cameras (e.g., video cameras) proliferates (e.g., for surveillance, mapping, communication, remote device operation, etc.), the volume of video data being analyzed continues to increase at a significant rate. Additionally, analyzing video data gathered via these cameras is increasingly complex, particularly in real-time. In particular, as tracking algorithms become more complex, performing real-time video analysis is a significant challenge. Conventional software-based algorithms can suffer from: a) drift, a phenomenon whereby the tracker latches onto and tracks an incorrect target; and/or b) occlusion, a phenomenon whereby the correct target is partially or fully blocked from line-of-sight vision over one or more frames.

BRIEF SUMMARY

Solutions for analyzing three-dimensional video data are disclosed herein. Various embodiments include a system having: at least one sensor for detecting at least one of object occlusion or drift in visual data; and a digital signal processor coupled with the at least one sensor, the digital signal processor having at least one database (DB) including target template sets for analyzing both object occlusion in visual data and drift in visual data, wherein the digital signal processor is configured to switch between one of the target template sets and a distinct target template set in the at least one DB based upon detection of the at least one of object occlusion or drift in the visual data.

A first aspect includes a system having: at least one sensor for detecting at least one of object occlusion or drift in visual data; and a digital signal processor coupled with the at least one sensor, the digital signal processor having at least one database (DB) including target template sets for analyzing both object occlusion in visual data and drift in visual data, wherein the digital signal processor is configured to switch between one of the target template sets and a distinct target template set in the at least one DB based upon detection of the at least one of object occlusion or drift in the visual data.

A second aspect includes a digital signal processor coupled with at least one sensor, the digital signal processor having: a processor unit; and at least one database (DB) connected with the processor unit, the at least one DB including target template sets for analyzing both object occlusion in visual data and drift in visual data, wherein the digital signal processor is configured to switch between one of the target template sets and a distinct target template set in the at least one DB based upon detection of the at least one of object occlusion or drift in the visual data.

A third aspect includes a digital signal processor coupled with at least one sensor, the digital signal processor having: a processor unit; and at least one database (DB) connected with the processor unit, the at least one DB including target template sets for analyzing both object occlusion in visual data and drift in visual data, wherein the digital signal processor is configured to switch between one of the target template sets and a distinct target template set in the at least one DB based upon detection of the at least one of object occlusion or drift in the visual data, wherein the target template sets include representations of a target candidate in the visual data as a set of basis templates, wherein the set of basis templates include a weighted sum of a template set and a virtual trivial template set, wherein the analyzing of the object occlusion in visual data and drift in visual data includes solving a vector equation represented as: $y=B*c$, wherein $y=$a vector representing the target candidate, $B=$a matrix representing the template set and the virtual trivial template set, and $c=$a vector representing a weight for each of the template set and the virtual trivial template set, and wherein the solving of the vector equation includes minimizing non-zero coefficients for c.

BRIEF DESCRIPTION OF THE DRAWINGS

FIG. 2 shows schematic equation-based depiction of a vector-based approach for analyzing/solving for occlusion in visual data according to various embodiments of the disclosure.

FIG. 3 shows an example matrix equation formed according to various embodiments of the disclosure.

It is noted that the drawings are not necessarily to scale. The drawings are intended to depict only typical aspects, and therefore should not be considered as limiting in scope. In the drawings, like numbering represents like elements between the drawings.

DETAILED DESCRIPTION

Figure 1:
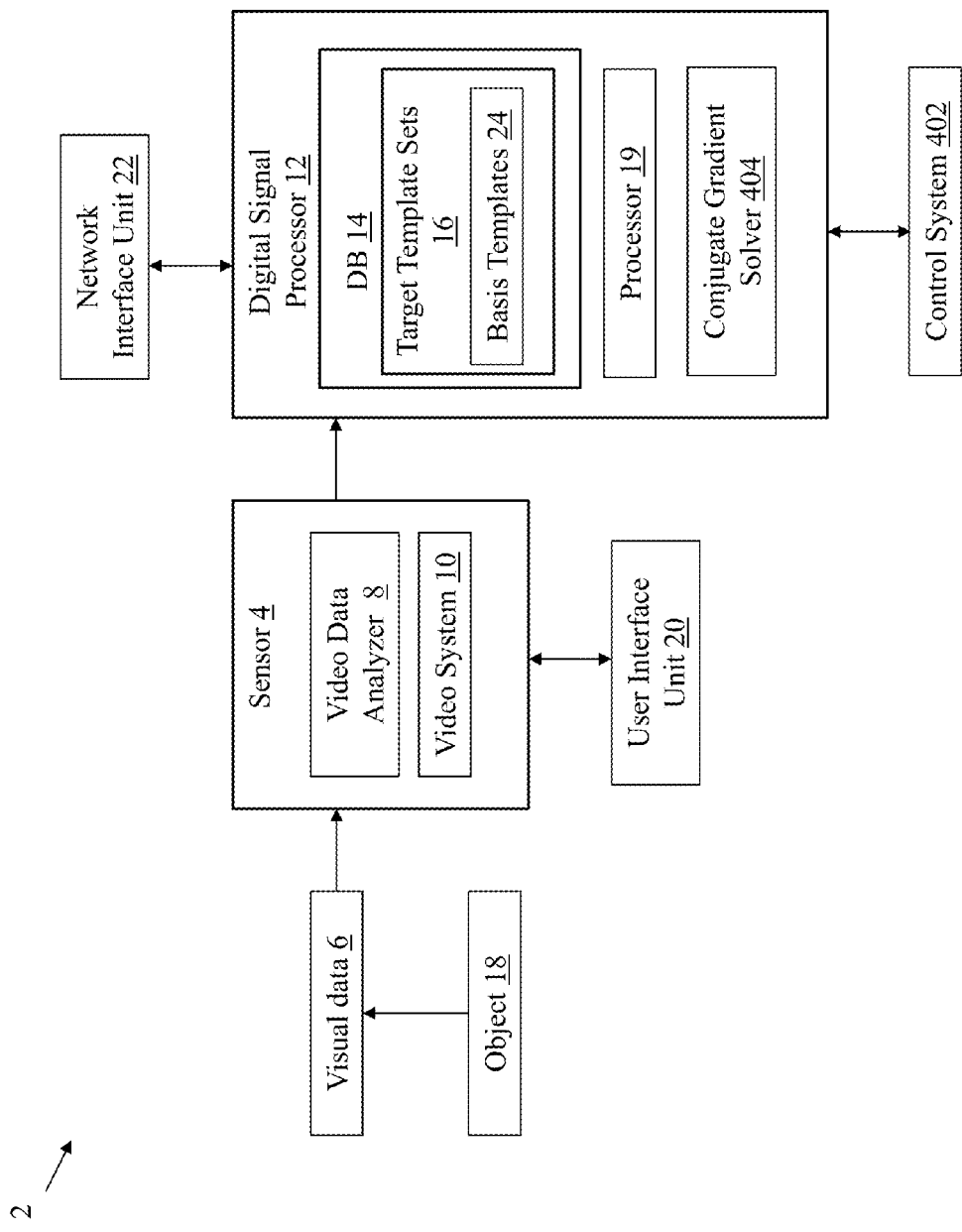
FIG. 1 shows a schematic depiction of a system according to various embodiments of the disclosure.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

As noted herein, conventional software-based algorithms can suffer from: a) drift, a phenomenon whereby the tracker latches onto and tracks an incorrect target; and/or b) occlusion, a phenomenon whereby the correct target is partially or fully blocked from line-of-sight vision over one or more frames. These software-based algorithms are ill-equipped to actively account for these phenomena.

Various embodiments described herein include a hybrid tracking system (including hardware) that can effectively switch between tracking paradigms based upon computational efficiency and robustness of tracking results. That is, the hardware implementations disclosed according to various embodiments are configured to detect drift and/or occlusion in video tracking, and in response to detecting one of drift or occlusion, switch from one tracking paradigm to another tracking paradigm to counteract the drift or occlusion. In particular, various embodiments include systems with digital signal processors (DSPs) configured to perform parallel processing of video data as described herein.

In nearly all applications of sparse representation, it is necessary to solve under-determined linear equations. This technique (solving under-determined linear equations) is referred to as $l_1$-minimization. That is, $l_1$-minimization involves solving an underdetermined linear system of equations (y=Bc), such that for the solution, most of the coefficients are zero. Conventional software-based methods of $l_1$-minimization are computationally intensive, and as such, difficult to execute in real-time analysis. According to various embodiments, the process of $l_1$-minimization is addressed via hardware solutions, e.g., using particularly programmed digital signal processors. The hardware implementation described herein allows for real-time implementation of $l_1$-minimization. This is in contrast to the software-based approaches, which require approximately 5-20 seconds of processing per visual frame, executing on all processing cores at a low resolution (e.g., 640×480 pixel resolution). The hardware implementation described according to embodiments herein can improve computational time by orders of magnitude.

Various embodiments include a sparse representation, $l_1$-minimization based video tracking system having at least one digital signal processor (DSP). The DSP uses parallel processing to perform real-time hybrid video tracking, as described herein. In particular, the DSP can include pipelined circuitry for matrix-vector video image processing, and a dimensionality-reduction multiplier unit.

FIG. 1 shows a schematic depiction of a system 2 according to various embodiments. As shown, the system 2 can include at least one sensor 4 for detecting at least one of object occlusion or drift in visual data 6. The at least one sensor 4 can include a video data analyzer 8, and in some cases, the at least one sensor 4 can include a video system 10 configured to capture the visual data 6. It is understood that according to various embodiments, the at least one sensor 4 can include a two-dimensional (2D) sensor, or a three-dimensional (3D) sensor. In various embodiments, the 3D sensor can be configured to specifically detect drift and/or occlusion in the visual data 6. However, it is understood that the various functions of the system 2 described herein can be performed using a 2D sensor as well.

In various embodiments, the system 2 can further include a digital signal processor 12 coupled with the at least one sensor 4 (e.g., via conventional hard-wired and/or wireless connection). The digital signal processor 12 can have at least one database (DB) 14 which includes target template sets 16 for analyzing both object occlusion in visual data 6 or drift in visual data 6. As described herein, object occlusion and/or drift may occur with respect to capturing visual data 6 about an object 18, e.g., while the object 18 moves in the field of view or other objects in the field of view move relative to the object 18. As noted herein, drift in the visual data 6 indicates the sensor 4 has tracked an incorrect target object 18 in a group of objects 18. Further, occlusion in the visual data 16 indicates a correct target object 18 is at least partially blocked from line-of-sight vision from the sensor 4 over one or more frames of capture. The digital signal processor 12 can further include a conventional processor 19 coupled (via conventional connection) with the at least one DB 14.

As described herein, the target template sets 16 can be used for analyzing object occlusion or drift in the visual data 6. The analyzing can include solving a vector equation represented as:

$$y = B * c. \tag{Equation 1}$$

Where y=a vector representing the target candidate, B=a matrix representing the template set and the virtual trivial template set, and c=a vector representing a weight for each of the template set and the virtual trivial template set, and wherein the solving of the vector equation includes minimizing non-zero coefficients for c. It is understood that the virtual trivial template set (including one or more virtual trivial templates) are represented as column vectors, and are termed "virtual" in that the virtual trivial templates need not be allocated in real memory space, which reduces the memory requirement in this configuration when compared with software solutions.

In various embodiments, the digital signal processor 12 is configured to switch (automatically) between one of the target template sets 16 and a distinct target template set 16 in the at least one DB 14, based upon detection of at least one of object occlusion or drift in the visual data 6.

The system 2 can further include a user interface unit 20 (allowing a user to interface with the sensor 4) coupled with the at least one sensor 4 (e.g., coupled via conventional wireless and/or hard-wired means), and a network interface unit 22 (allowing interface between the digital signal processor 12 and a network), coupled with the digital signal processor 12 (via conventional wireless and/or hard-wired means).

The target template sets 16 in the DB 14 within the digital signal processor 12 can include representations of a target candidate (e.g., target object 18) in the visual data 6 as a set of basis templates 24. These basis templates 24 can include a weighted sum of a template set, T, and a virtual trivial template set, e. The template set (T) is obtained from one of: a) an initial target candidate selection, b) a reference database, or c) an appearance of a target candidate in a previous frame. The virtual trivial template set (e) can include single-pixel perturbations which deviate from the template set (T), and include a set of positive templates and a set of negative templates.

FIG. 2 shows a schematic equation-based depiction of the vector-based approach for analyzing/solving for occlusion in visual data according to various embodiments. As shown, the variable B, representing the template set and the virtual trivial template set in equation y=B*c (Equation 1), is decomposed as a set of template sets (T) (or, regular templates), plus a set of virtual trivial template sets (e). The virtual trivial template sets (e) can include both positive virtual trivial templates and negative virtual trivial templates. The collective solution for B*c (where c is a vector representing a weight for each of the template set and the virtual trivial template set) is the composite image 200. As shown, product B can be represented as: $y = T*a + I*e^+ - I*e^-$. Each of a, e+ and e− are vectors, which are multiplied by vectors for the template sets (T), trivial positive templates, and trivial negative templates, respectively. The product B is then multiplied by a vector representing a weight for each of the template set and the virtual trivial template set to form the composite image 200. Composite image 200 is the image which approaches described herein attempt to represent in terms of templates (T, e), which are weighted by vectors (a, e− and e+). According to various embodiments, the templates (T, e), and in particular, the virtual trivial template sets (e+, e−), are hard-wired into the system 2 such that they can be called up on demand in order to calculate composite image 200.

FIG. 3 shows an example matrix 300 formed according to the above-noted equation for y (Equation 1). As shown, y becomes a column vector represented by d=i*j, B becomes a matrix represented by d*(n+2d), and c is a vector represented by (n+2d)*1. It is understood that y is the image patch (segment of an image) to be represented in terms of template sets (T, e), and in order to calculate appropriate weighting coefficients (c), y1 is designated as the upper left pixel of the image patch, and yd is designated as the lower right pixel in the image patch (e.g., in a conventional raster scan). As shown, t1 is the first template, t2 the second template, etc., and t11 correlates with the upper left pixel (with y1), and t1$d$ correlates with the lower right pixel (e.g., in a raster scan). As noted herein, and also known in the art, matrix 300 is solved such that non-zero coefficients (c) are minimized. As an example, y1 is calculated according to:

$$y1 = t11*c1 + t21*c2 + t31*C3 + \quad \text{(Equation 2)}$$

As described herein, various embodiments focus on finding the solution to y=B*c where the [c] vector has the fewest non-zero elements possible.

Figure 4:
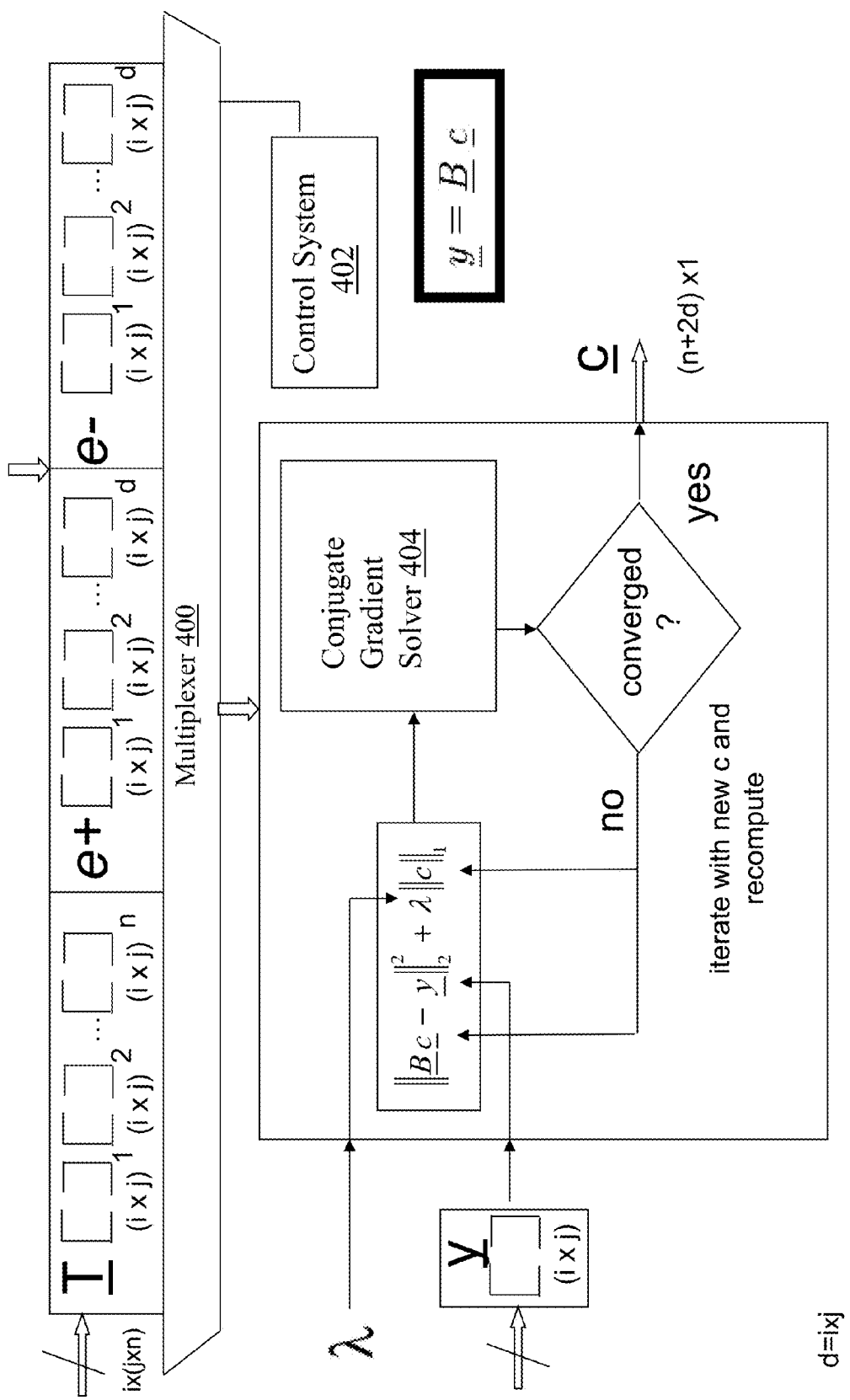
FIG. 4 shows a schematic data flow diagram according to various embodiments of the disclosure.
Figure 5:
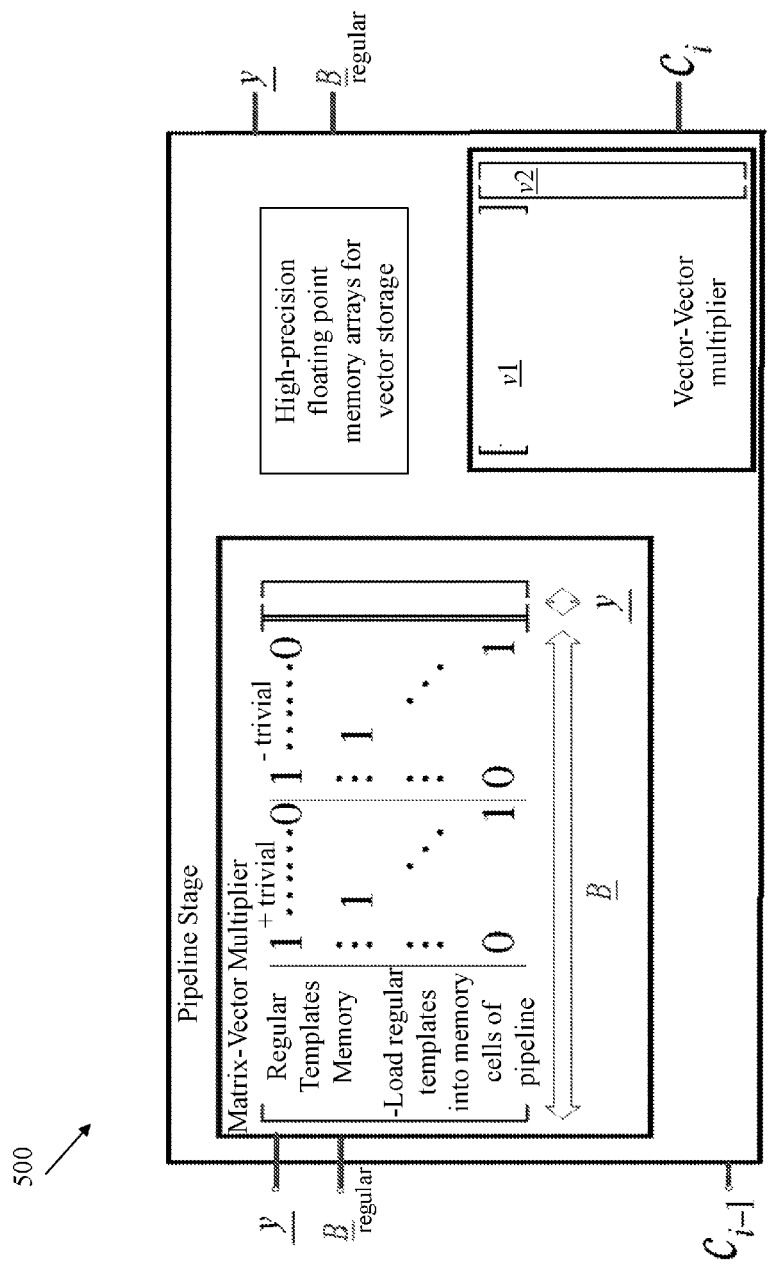
FIG. 5 shows a schematic depiction of a pipeline within a digital signal processor according to various embodiments.

It is understood that these templates (T, e) can be loaded in the DB 14, and the digital signal processor 12 (including processor 19) is configured to minimize inaccuracies in the processed visual data 6 by switching between templates (e.g., T, e) as noted herein. According to various embodiments, the templates (e.g., T, e) can be mapped to the DB 14, as demonstrated in the schematic data flow diagram in FIG. 4. As shown, the set of template sets (T), along with the virtual trivial template sets (e+, e−), can be prepopulated in the DB 14. In various embodiments, the templates (e.g., T, e) can be prepopulated in a multiplexer 400 within the digital signal processor 12, which may be controlled by a control system 402. The digital signal processor 12 can further include a conjugate gradient solver 404, which may solve the matrix equations as represented in FIGS. 2-3. FIG. 5 shows a schematic depiction of an example pipeline 500, within the digital signal processor 12, which can perform processes as described herein.

Figure 6:
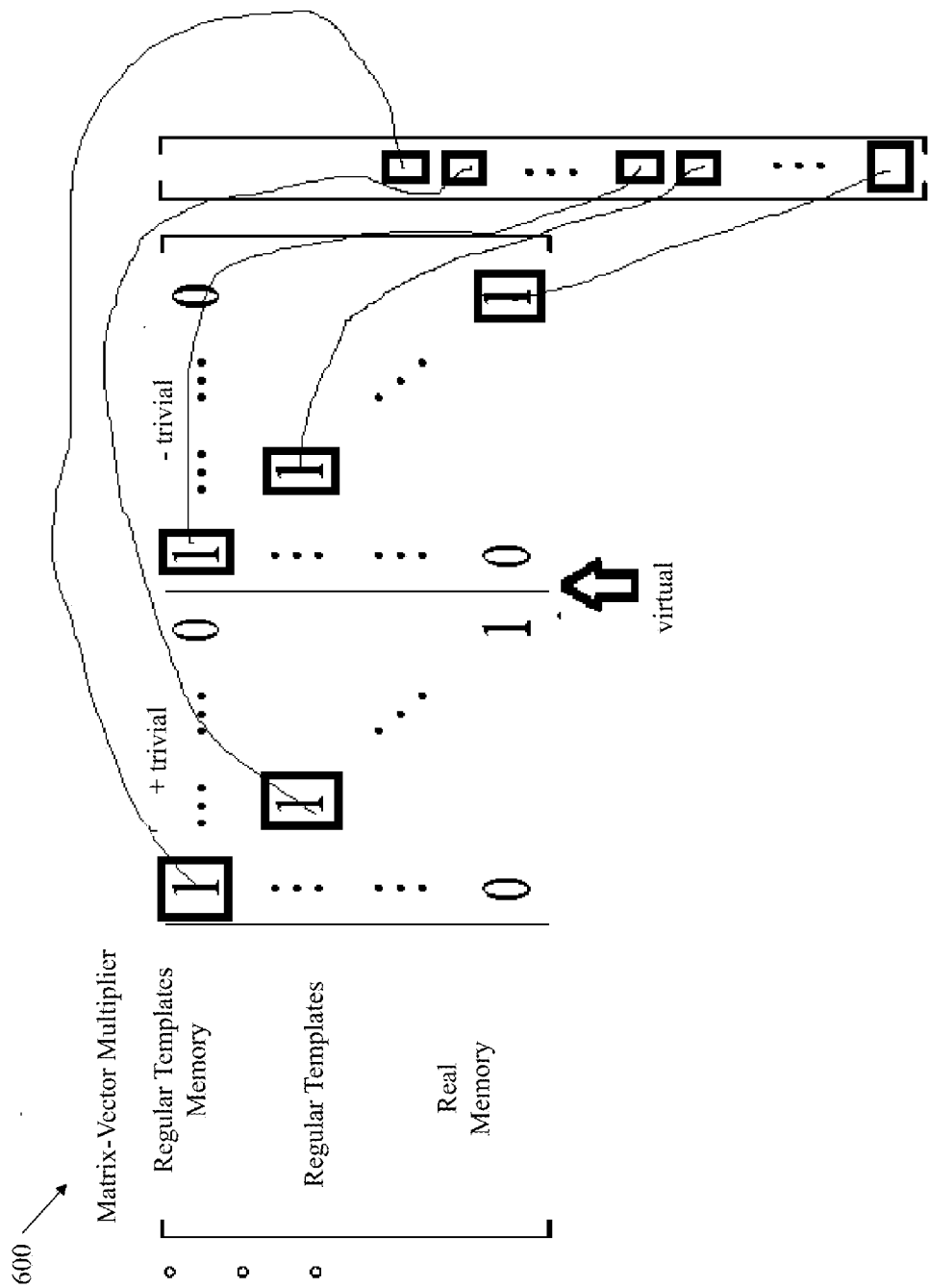
FIG. 6 shows an example schematic mathematical diagram illustrating additional detail of operations performed by the pipeline of FIG. 5.

FIG. 6 is an example schematic mathematical diagram 600 showing additional detail of operations performed by the pipeline 500 of FIG. 5. In particular, the diagram 600 shows sub-matrices representing the virtual trivial templates, where the virtual trivial templates need not be stored in their entirety, but instead, can be stored using key values (indicated in bold boxes) which can index the remainder of each virtual trivial template. Key values are indicated as mapped for illustrative purposes.

Figure 7:
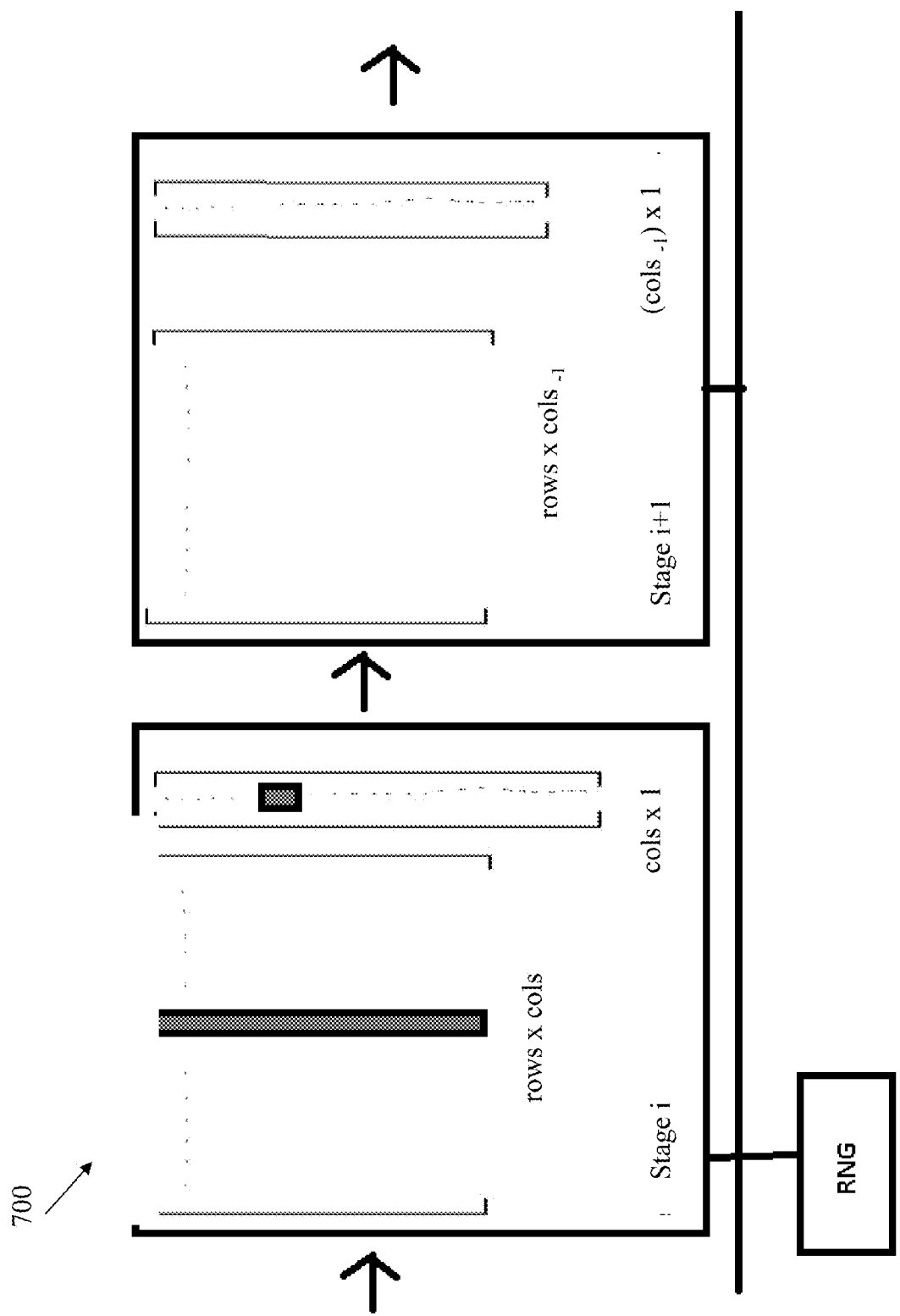
FIG. 7 shows an additional example schematic mathematical diagram showing additional detail of how dimensionality of the virtual template matrices can be reduced.

FIG. 7 shows an additional example schematic mathematical diagram 700 showing additional detail of how dimensionality of the virtual template matrices can be reduced. As shown, in this example, periodically (e.g., ever W-frames), the lowest contributing c-coefficient is eliminated (e.g., W=1 is every frame, eliminate a row from c-vector and corresponding column from B-matrix). In various optional embodiments, a random number generator (RNG) can be utilized to select from degenerately weighted non-contributing weights.

It is understood that in the flow diagram shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., wiring, soldering, fastening, ultrasonic welding, bonding).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose various embodiments, including the best mode, and also to enable any person skilled in the art to practice, including making and using any devices or systems and performing any incorporated methods. The patentable scope of the various embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A digital signal processor coupled with at least one sensor, the digital signal processor comprising:
    a processor unit; and
    at least one database (DB) connected with the processor unit, the at least one DB including target template sets for analyzing both object occlusion in visual data and drift in visual data,
    wherein the digital signal processor is configured to switch between one of the target template sets and a distinct target template set in the at least one DB based upon detection of the at least one of object occlusion or drift in the visual data.

2. The digital signal processor of claim 1, wherein the target template sets include representations of a target candidate in the visual data as a set of basis templates.

3. The digital signal processor of claim 2, wherein the set of basis templates include a weighted sum of a template set, T, and a virtual trivial template set, e.

4. The digital signal processor of claim 3, wherein the template set is obtained from an initial target candidate selection, a reference database, or from an appearance of the target candidate in a previous frame.

5. The digital signal processor of claim 3, wherein the virtual trivial template set includes single-pixel perturbations deviating from the template set, the single-pixel perturbations including a set of positive templates and a set of negative templates.

6. The digital signal processor of claim 1, wherein drift in the visual data indicates the sensor has tracked an incorrect target object, and wherein occlusion in the visual data indicates a correct target object is at least partially blocked from line-of-sight vision from the 3D sensor over one or more frames.

7. A digital signal processor coupled with at least one sensor, the digital signal processor comprising:
  a processor unit; and
  at least one database (DB) connected with the processor unit, the at least one DB including target template sets for analyzing both object occlusion in visual data and drift in visual data,
  wherein the digital signal processor is configured to switch between one of the target template sets and a distinct target template set in the at least one DB based upon detection of the at least one of object occlusion or drift in the visual data,
  wherein the target template sets include representations of a target candidate in the visual data as a set of basis templates, wherein the set of basis templates include a weighted sum of a template set and a virtual trivial template set,
  wherein the analyzing of the object occlusion in visual data and drift in visual data includes solving a vector equation represented as:

$$y = B * c,$$

wherein y=a vector representing the target candidate, B=a matrix representing the template set and the virtual trivial template set, and c=a vector representing a weight for each of the template set and the virtual trivial template set, and wherein the solving of the vector equation includes minimizing non-zero coefficients for c.

8. The digital signal processor of claim 7, wherein the template set is obtained from an initial target candidate selection, a reference database, or from an appearance of the target candidate in a previous frame.

9. The digital signal processor of claim 7, wherein the virtual trivial template set includes single-pixel perturbations deviating from the template set, the single-pixel perturbations including a set of positive templates and a set of negative templates.

10. The digital signal processor of claim 7, wherein the vector representing a weight for each of the template set and the virtual trivial template set includes a weight for each of the template set, the set of positive templates and the set of negative templates.

11. The digital signal processor of claim 7, wherein drift in the visual data indicates the 3D sensor has tracked an incorrect target object, and wherein occlusion in the visual data indicates a correct target object is at least partially blocked from line-of-sight vision from the 3D sensor over one or more frames.

* * * * *